(12) United States Patent  
Carson (10) Patent No.: US 8,316,743 B2
(45) Date of Patent: Nov. 27, 2012

(54) QUICK CHANGE TOOL HOLDER (75) Inventor: James R. Carson, Concord, OH (US)

(73) Assignee: Fischer Special Tooling, Mentor, OH (US)

( * ) Notice: Subject to any disclaimer, the term of this patent is extended or adjusted under 35 U.S.C. 154(b) by 488 days.

(21) Appl. No.: 12/611,370

(22) Filed: Nov. 3, 2009

(65) Prior Publication Data

US 2010/0107831 A1 May 6, 2010

Related U.S. Application Data (60) Provisional application No. 61/110,758, filed on Nov. 3, 2008.

(51) Int. Cl.
B23B 29/24 (2006.01)
B23B 29/00 (2006.01)

(52) U.S. Cl. .............. 82/161; 82/159; 82/158
(58) Field of Classification Search .......... 82/157, 82/158, 159, 160, 161; 403/381; 409/232, 409/234
See application file for complete search history.

(56) References Cited

U.S. PATENT DOCUMENTS

| 2,972,272 | A | * | 2/1961 | Sirola | 82/159 |
| 4,286,485 | A | * | 9/1981 | Dezvane et al. | 82/158 |
| 4,850,255 | A | * | 7/1989 | Pruvot et al. | 82/160 |
| 5,112,164 | A | * | 5/1992 | Pano | 407/110 |
| 5,417,131 | A | * | 5/1995 | Robertson | 82/158 |
| 5,551,795 | A | * | 9/1996 | Engibarov | 403/381 |
| 6,571,671 | B1 | * | 6/2003 | Giannetti | 82/160 |

* cited by examiner

Primary Examiner — Will Fridie, Jr.
(74) Attorney, Agent, or Firm — Fay Sharpe LLP (57) ABSTRACT A quick change tool holder having a base member, a body, a quick change head member, and a cutting tool cartridge. The base member includes an upper surface, bottom surface, and mating surface and is adapted to removably mount to an associated cutting machine carriage. The body includes an end wall and an inner surface, where the end wall includes a dovetail portion. The body is adapted to engage the base member in an interlocking fashion. The quick change head includes a top surface, a bottom surface, an interface wall having a channel disposed therein, and an outer wall having a plurality of longitudinal grooves, wherein said channel is adapted to receive said dovetail portion. The cutting tool cartridge is adapted to engage the longitudinal grooves of the quick change head.

20 Claims, 6 Drawing Sheets

QUICK CHANGE TOOL HOLDER

This application claims priority from U.S. Provisional Application Ser. No. 61/110,758, filed Nov. 3, 2008, the subject matter of which is hereby incorporated herein by reference in its entirety.

BACKGROUND

The subject matter of the present disclosure relates to a tool holder, and more particularly to an improved tool holder that permits the quick change of a cutting tool.

Typically, machines such as metal cutting machines and other hard material cutting machines must exert extremely large forces to effectively cut the desired material. Throughout the course of a cutting operation it may become necessary to change a cutting member, as it may become dull or a particular type of operation requires use of a different cutting member. In addition, a cutting member will often have more than one cutting edge or tip that can be used. In that case, a cutting member can be rotated or flipped over to bring another edge or tip to the cutting position. Accordingly, in cutting machine operations, cutting members must be changed continuously, regardless of the reason. Therefore, it is desirable to make such changes in the most efficient manner possible.

Currently, all cutting insert changes must be performed manually. Since most cutting members are held in place with screws, changing a cutting member insert takes a relatively long time to complete. Lengthy changes lower productivity and increase processing costs of a work piece. This is especially true in light of the fact that cutting members generally must be changed thousands of times per year. Furthermore, an operator must be highly skilled to properly change and realign an insert, and conversely, the lack of this skill level can often lead to incorrect installation and significant scrap losses.

One type of cutting tool holder that has been suggested is disclosed in U.S. Pat. No. 4,784,543, wherein a quick change tool holder has a cutting element removably attached to a head and the head is removably attached to a shank. The cutting head and shank are removably attached to one another via a lockpin/locknut combination. The surface of the cutting head engages the shank with longitudinally extending teeth that engage with the teeth of the cutting head to prevent rotation.

U.S. Pat. No. 7,153,069, issued to Van Horssen on Dec. 26, 2006, teaches a quick change tool holder that does not require tools or screws for securing or removing a cutter insert. The holder comprises a housing adapted to receive and conform to the shape of a cutter insert. A pivoting arm is mounted to the housing and includes a clamp portion adapted to engage the cutter insert. The holder further includes a cam with a clamp position which forces the clamp portion to engage a cutter insert and a release position which forces the clamp portion to disengage from a cutter insert.

However, none of the known prior art discloses a multiple use quick change cutting tool holder that allows (i) adjustments to be made off line, (ii) one handed installation, (iii) a six point alignment system, and (iv) readily discernable proper placement.

BRIEF DESCRIPTION

It is an advantage of the present disclosure to provide a quick change tool holder. The device includes a base member with an upper surface, bottom surface, and mating surface. The base member is adapted to removably mount to an associated cutting machine carriage. The device further includes a body having an end wall and an inner surface, where the end wall includes a dovetail portion and the body is adapted to engage the base member in an interlocking fashion. A quick change head is provided that includes a top surface, a bottom surface, an interface wall having a channel disposed therein that is adapted to receive the dovetail portion, and an outer wall having a plurality of longitudinal grooves. A cutting tool cartridge has a first wall including a plurality of t-nuts adapted to engage the longitudinal grooves of the quick change head. The device also includes a cutting blade that connects to the cutting tool cartridge.

It is another advantage of the present disclosure to provide a cutting tool holder for quickly changing a cutter insert. The cutting tool holder includes a base member adapted for securement to a cutting machine carriage including at least one locking bolt with a compound angle, a main body, a quick change head, and a cutting tool cartridge. The main body is shaped to provide a multiple surface interface with the base member, and further includes at least one bore adapted to engage the locking bolt of the base member. The quick change head includes a first side having a channel adapted to mate with the dovetail portion and a second side including a means for securing the cutting tool cartridge. Preferably, the holder includes a six point orientation system that enables the base member and main body to interlock with precise alignment, while also allowing for customized orientation to the machine's coordinate system.

It is yet another advantage of the present disclosure to provide a cutting tool holder for quickly changing a cutter insert. The cutting tool holder includes a base member that may be secured to a cutting machine carriage and includes at least one locking bolt. The holder further includes a main body that is shaped to provide a multi-surface interface with the base member, and includes a dovetail portion disposed at one end. A quick change head is further included, having a first side with a channel adapted to mate with the dovetail portion and a second side including a means for securing a cutting tool cartridge. The dovetail and the channel are each tapered such that a narrow portion of the dovetail slides into a wider portion of the channel.

It is yet another advantage of the present disclosure to provide a cutting tool cartridge. The cutting tool cartridge includes a body with a plurality of passages and a recess adapted to partially engage a dowel and a plurality of t-nuts. The passages accommodate screws that are capable of engaging the t-nuts and securing the t-nuts to the body. A cutting blade is further included having a first edge with a slotted recess, a cutting edge opposite the first edge, and a top surface including a channel traversing the length of the surface. The blade is positioned on the body such that the slotted recess partially engages the dowel. A blade clamp is positioned above the cutting blade and is adapted to secure the cutting blade to the body. The blade clamp includes a radius that is capable of engaging the channel.

Further advantages of the subject disclosure will become apparent from the following description of the subject matter taken in conjunction with the accompanying drawings, which form an integral part thereof.

DETAILED DESCRIPTION

Figure 1:
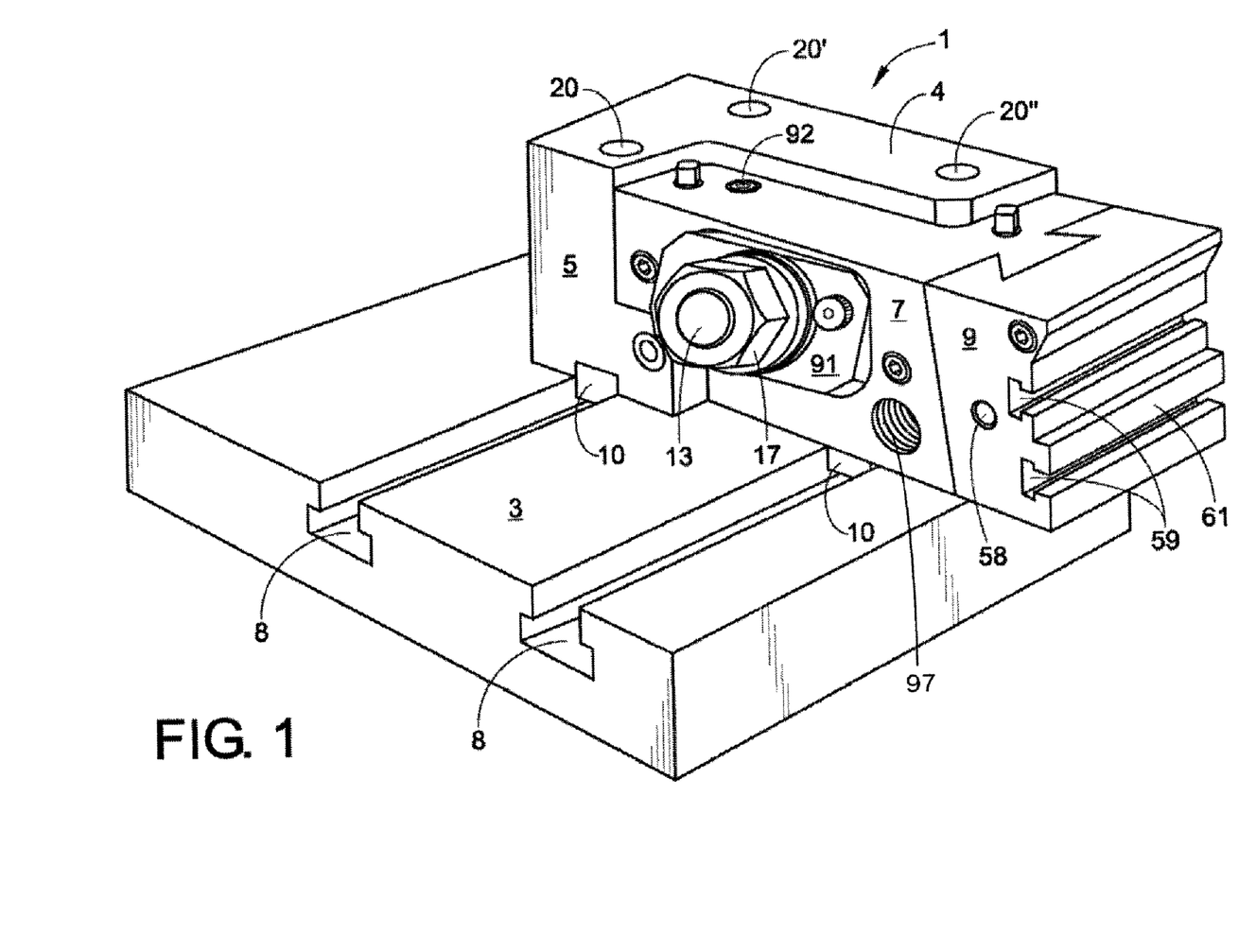
FIG. 1 is a perspective view of the quick change tool holder mounted on a cutting machine, with the cutting cartridge removed.
Figure 2:
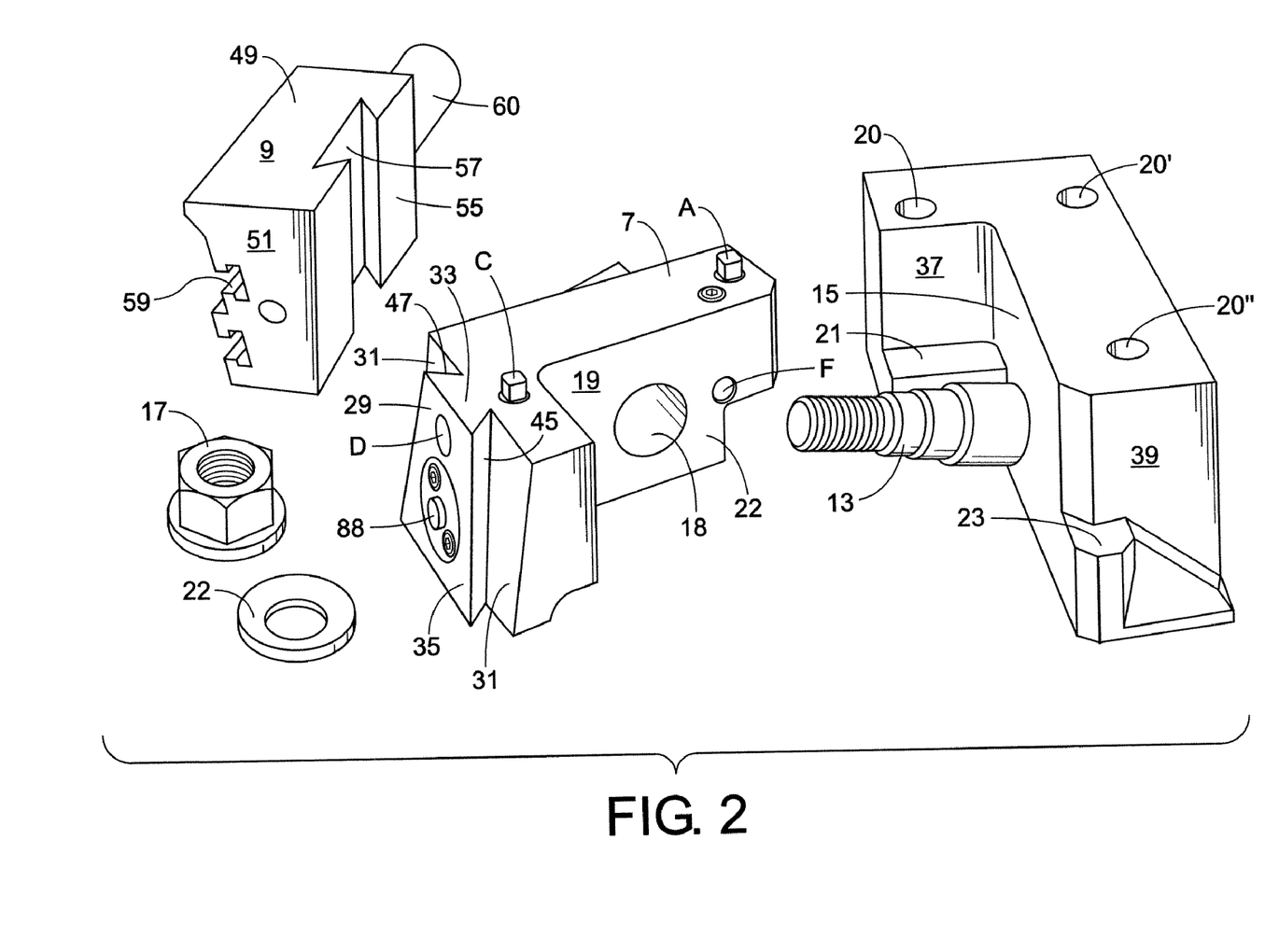
FIG. 2 is an exploded view of the quick change tool holder in accordance with the present disclosure.
Figure 3:
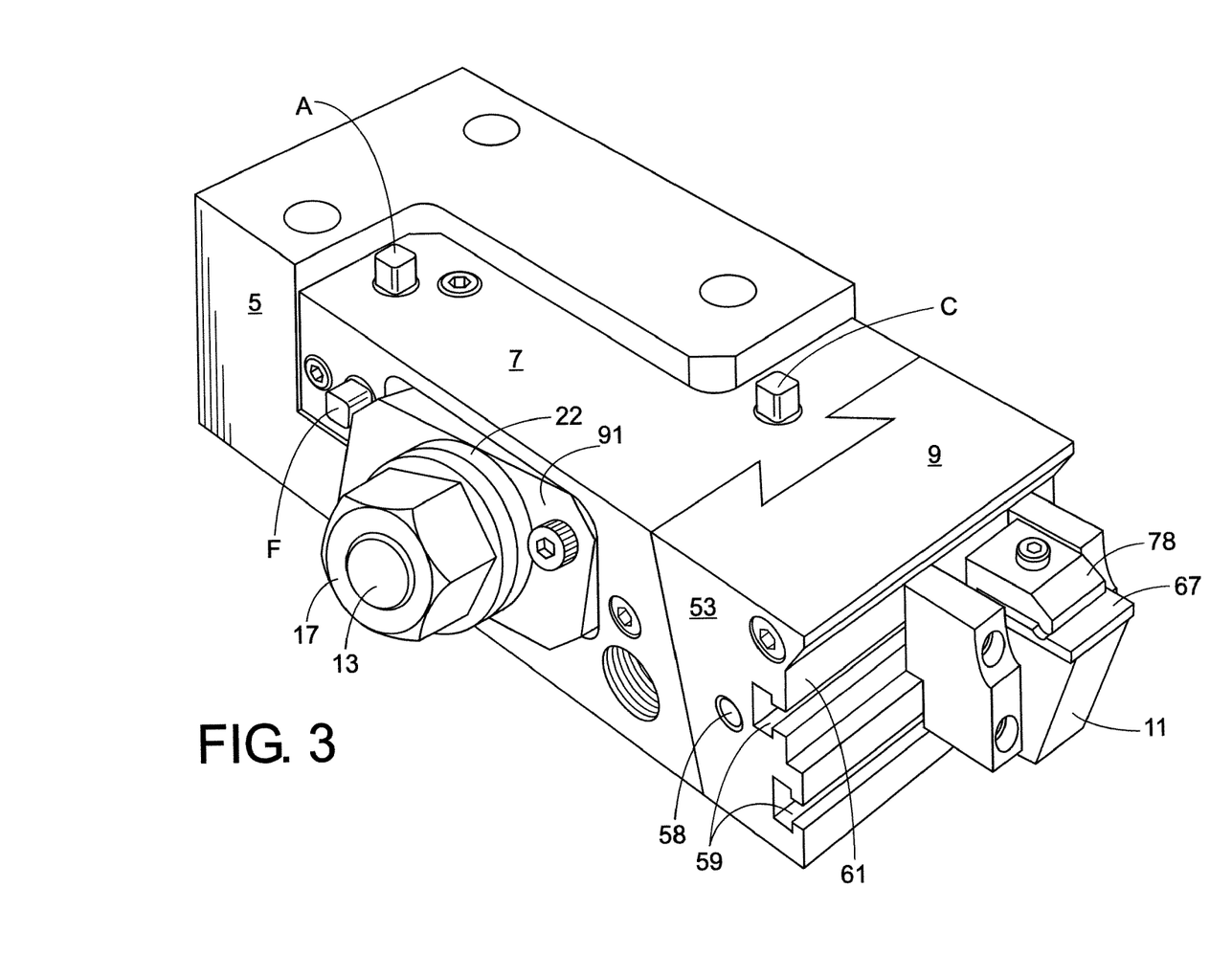
FIG. 3 is a perspective view of the one embodiment of the subject tool holder with the cutting tool cartridge installed.

Referring to the drawings by characters of reference, the Figures disclose combinations of features which constitute the components of one exemplary embodiment of the quick change tool holder. FIG. 1 illustrates a configuration in which the quick change tool holder 1 is attached to cutting machine carriage 3, which is representative of a cutting machine (not shown) cross slide table. The quick change tool holder 1 (as best seen in the combination of FIGS. 1-3) comprises a base member 5, a main body 7, a quick change head 9, and a cutting tool cartridge 11.

As best illustrated in FIG. 1, the base member 5 is mounted to a cutting machine carriage 3, which would be affixed to a cutting machine (not shown). The base member 5 is removably mounted to the cutting machine carriage 3 by the elongated key ways 8 in which complementary keys 10 extend. Keys 10 are fastened to base member 5 by screws (not shown). This provides for the initial relative alignment of holder 1 to the cutting machine. Top surface 4 of base member 5 is provided with through holes 20, 20' and 20" through which bolts (not shown) to secure base member 5 to cutting machine carriage 3.

Figure 6:
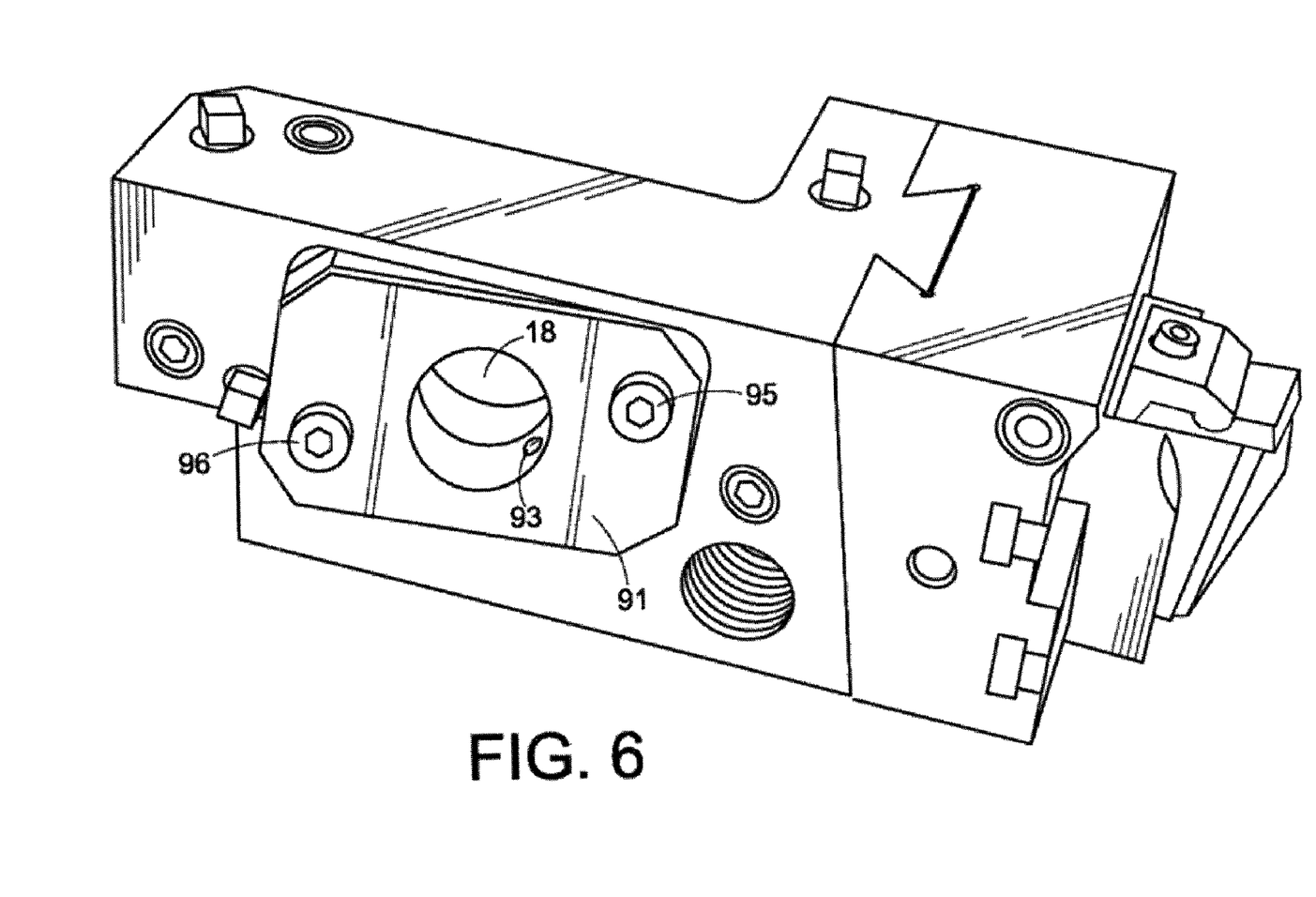
FIG. 6 is a perspective view of the quick change tool holder demonstrating a floating collar.

The depicted main body 7 is designed to engage the base member 5 in an interlocking "L" fashion. The base member 5 includes bolt 13, extending at a compound angle from the mating surface 15 of the base member 5. The main body 7 includes a floating collar 91 with three internal spring loaded bearings 93 (See FIG. 6). As the bolt 13 passes through bore 18 in main body 7, the three spring-loaded bearings 93 engage the bolt 13, gripping the bolt 13 in place until locking nut 17 and beveled washer 22 can be secured. Securing locking nut 17 to bolt 13 draws inner surface 19 and related alignment contact points of main body 7 into contact with mating surface 15 of base member 5. The main body 7 may be generally shaped as an opposite of the base member 5; however any suitable shape may be used. In addition to securing the main body 7 to base member 5, locking nut 17 also secures the floating collar 91 to the main body 7. Screws 95 and 96 (FIG. 6) bottom out just prior to engaging the face of the collar 91, thereby causing collar 91 to slightly "float" off the main body 7. The tightening of locking nut 17 completely secures the collar 91 to the main body 7 and the main body 7 to the base member 5.

Figure 5:
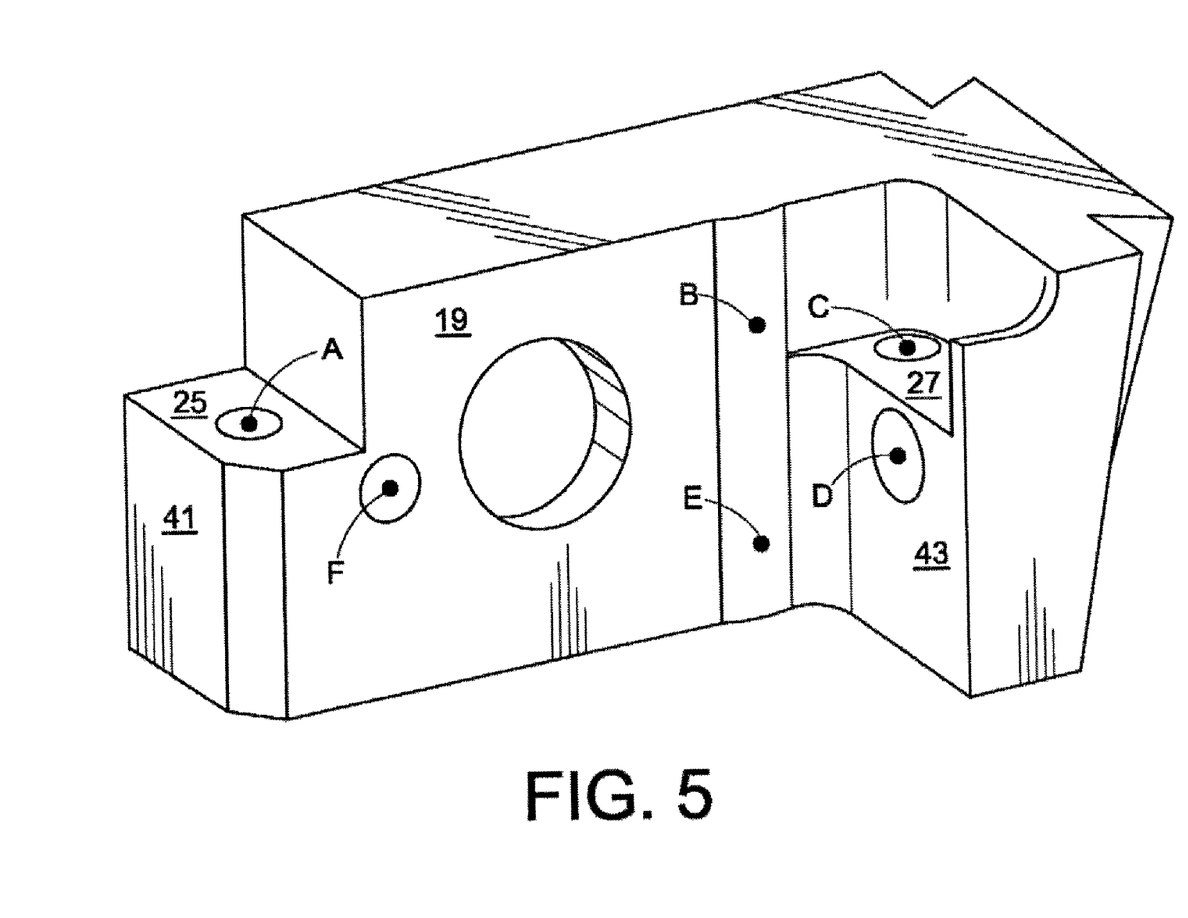
FIG. 5 is a perspective view of the six point alignment system, shown on the base member.

The base member 5 and main body 7 include a six point contact alignment configuration. FIG. 5 illustrates one embodiment of the six point contact configuration wherein the base member comprises six contact points A-F, establishing a primary, secondary, and tertiary method of controlled orientation. In addition to the mating between surface 15 and inner surface 19, which establish primary spacial orientation, ledges 21 and 23 (FIG. 2) provide vertical support of cooperative surface 25 and 27 (FIG. 5) of main body 7, thus establishing secondary orientation. In addition, wall 39 of base member 5 (FIG. 2) mates with wall 43 (FIG. 5) of main body 7 establishing tertiary orientation. In this manner, fasteners extending through points A-F can be rotated to adjust alignment of main body 7 relative to base member 5. FIG. 1 illustrates lock screw 92 that may be used to secure a fastener through points F in a preferred position. Other adjustment fasteners A-E can be secured by other lock screws in a similar fashion.

The main body 7 further includes a dovetail projection 29 extending from the end wall 31. The dovetail portion 29 is preferably tapered such that the upper section 33 is substantially narrower than the lower section 35 and is bound by opposed "V" shaped notches at edges 45 and 47.

As illustrated in FIG. 1, the main body 7 includes connection port 97, for engaging a feed (not shown) for supplying coolant to a cavity (not shown).

The quick change head 9 is preferably of a substantially trapezoidal shape, comprising a top surface 49, a bottom surface (not shown), and side walls 51 and 53. Interface wall 55 includes channel 57 and is formed in such a shape as to cooperatively engage the dovetail portion 29 of the main body 7. Moreover, as with the dovetail portion 29, the channel 57 is tapered, wherein it is narrower adjacent top surface 49 than at the bottom. The dovetail portion 29 of the holder body connects with the quick change head 9 by sliding into the channel 57. The dovetail portion 29 further includes a spring-loaded latch 88 that locks the quick change head 9 to the main body 7. A release for latch 88 is accessible via port 58 such that a tool (not shown) may be inserted into the port 58 that activates the release (not shown) to unlock the quick change head 9. The tapered dovetail formation secures the quick change head 9 to the main body 7 in such as way that any misalignment resulting from entrained scrap pieces will cause a palpable misalignment between top surface 49 of head 9 and upper section 33 of dovetail 29.

The quick change head 9 includes elongated longitudinal grooves 59 along its outer surface 61. The cutting tool cartridge 11 may be removably attached to the quick change head 9 by gliding the complementary t-nuts 65 extending from a first wall of the cutting tool cartridge 11 into the grooves 59 on the quick change head 9, creating an interlocking union.

Figure 4:
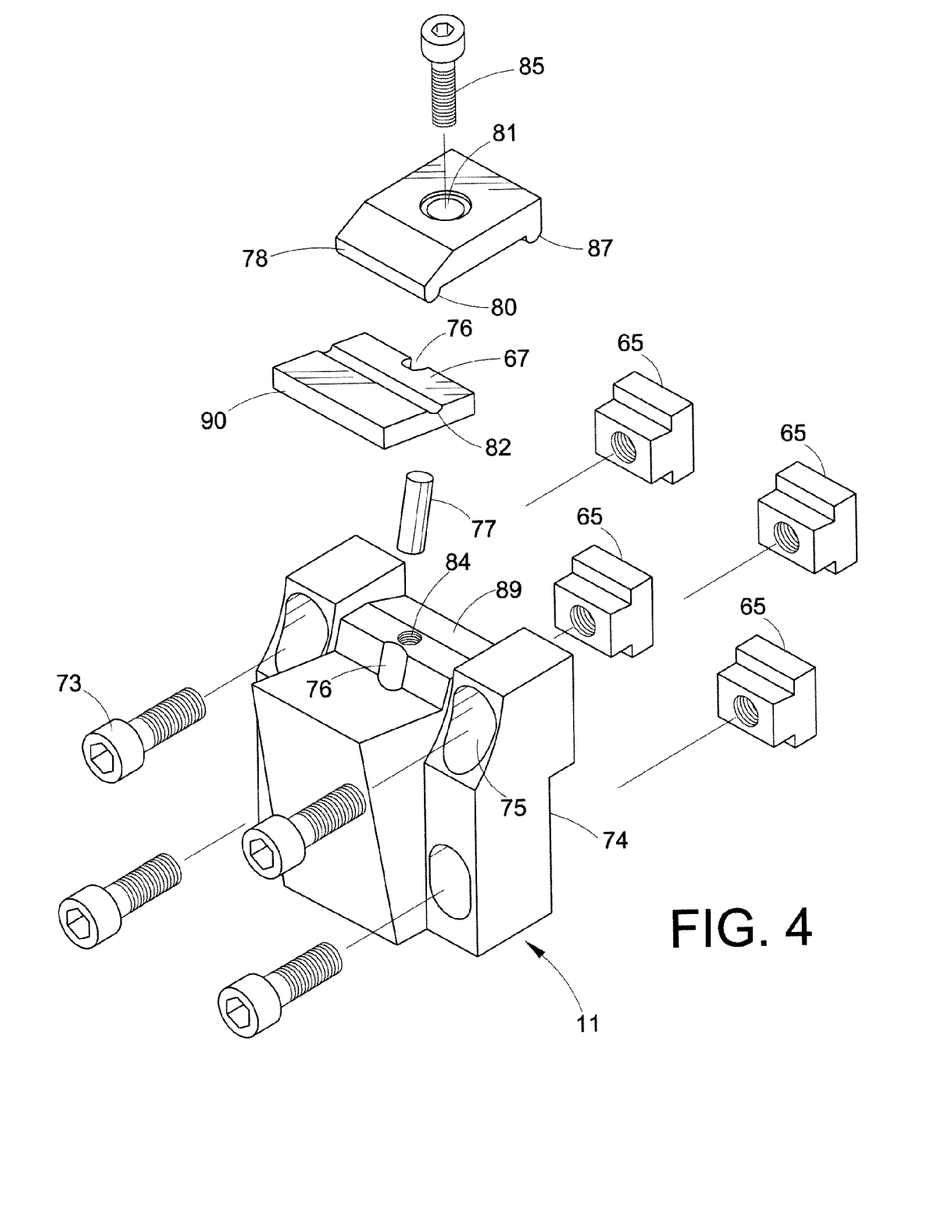
FIG. 4 is an exploded view of the cutting tool cartridge in accordance with the present disclosure.

FIG. 4 illustrates an exploded view of one embodiment of a cutting tool cartridge 11 including a body 74 with passages 75 traversing the body. The passages 75 accommodate screws 73 which engage t-nuts 65, locking the projections 65 in place. The body 74 further includes a recess 76 adapted to partially engage a dowel 77. Cutting blade 67 is precisely positioned on top of the body by partially engaging the dowel 77 in a slotted recess 76 in the edge opposite the cutting edge 90. A blade clamp 78 may be positioned over the cutting blade 67 to secure the blade 67 to the body 74. Blade clamp 78 includes a first radius 80 adapted to engage a channel 82 traversing the blade 67, and a second radius 87. Blade clamp 78 further includes a hole 81 adapted to receive a screw 85. Screw 85 may be inserted into a threaded bore 84 in body 74 and tightened to secure the blade clamp 78 and cutting blade 67 in place. The body 74 further includes a surface 89, which is angled such that initial tightening of screw 85 will engage second radius 87 of clamp 78. Further tightening of screw 85 will cause clamp 78 to pull cutting blade 67 into a secure position via the direct forces of radius 80 engaging channel 82. This repeatable clamping movement is all accomplished without any final guidance necessary from the individual replacing the cutting blade; thus assuring minimal variation.

The quick change cutting tool holder enables adjustments and changes to be made while the cutting head member is detached from the holder body. The cutting head member can be completely separated from a cutting machine to aid in the quick and precise cutting insert change. The quick change cutting tool holder facilitates an effective changeover time in less than one minute, and can be performed with the use of only one hand. The cutting head member further utilizes a single fastener, six point alignment configuration to improve alignment precision and reduce waste. Advantageously, the six point alignment allows an operator to make positioning adjustments outside of the machine, greatly improving holder's effectiveness and reducing the time required by the operator for initial job set up. Moreover, dovetail portion will show a failure to properly align which can be felt by the operator if chip fragment(s) or other debris becomes lodged therebetween. The tapers in the dovetail portion 29 and the notches 45 and 47 ensure proper placement of quick change head 9 and allow for the highest degree of repeatable orientation. The tapered interlock allows for an accurate interface between the body and the head, such that there is super high repeatability which may show variation of less than 5 micron/ 0.0002".

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A cutting member comprising:
   a base member having an upper surface, bottom surface, and mating surface, said base member being adapted to removably mount to an associated cutting machine carriage;
   a body having an end wall and an inner surface, said end wall including a dovetail portion, said body being adapted to engage the base member in an interlocking fashion;
   a quick change head including a top surface, a bottom surface, interface wall having a channel disposed therein, and an outer wall having a plurality of longitudinal grooves, wherein said channel is adapted to receive said dovetail portion; and
   a cutting tool cartridge with a first wall including a plurality of t-nuts adapted to removably engage said longitudinal grooves.

2. The cutting member of claim 1, wherein said dovetail projection, having an upper section and a lower section, is tapered such that the upper section is substantially narrower than the lower section.

3. The cutting member of claim 2, wherein said dovetail portion is adapted to slide into said channel.

4. The cutting member of claim 1, wherein said dovetail portion includes a spring loaded latch adapted to lock said quick change head to said body.

5. The cutting member of claim 4, further including a release latch disposed within said quick change head, wherein said release latch is adapted to release the spring loaded latch.

6. The cutting member of claim 1, further including a six point alignment system having six contact points, enabling said base member and said body to interlock with controlled orientation.

7. The cutting member of claim 6, wherein each contact point includes a fastener adapted to align said body with said base member.

8. The cutting member of claim 7, wherein said base member includes a bolt that extends at a compound angle from said mating surface of said base member.

9. The cutting member of claim 1, wherein said body includes a floating collar.

10. A cutting tool holder for quickly changing a cutter insert, said cutting tool holder comprising:
    a base member adapted for securement to a cutting machine carriage and including at least one bolt having a compound angle;
    a main body shaped to provide a multi-surface interface with said base member including at least one bore adapted to engage said at least one bolt of said base member; said main body further including a dovetail portion; and
    a quick change head comprising a first side having a channel adapted to mate with said dovetail portion and a second side including a means for securing a cutting tool cartridge.

11. The cutting tool holder of claim 10, wherein said cutting tool holder comprises a six point orientation system.

12. The cutting tool holder of claim 11, wherein said six point orientation system includes primary, secondary and tertiary levels of orientation.

13. The cutting holder of claim 12, wherein said primary level of orientation comprises coupling said mating surface with said inner surface.

14. The cutting holder of claim 12, wherein said secondary level orientation includes mating a first and second cooperative surface of said body with corresponding first and second ledges disposed on said base.

15. The cutting holder of claim 12, wherein said tertiary level orientation includes mating a back wall of said base with an end wall of said inner surface.

16. The cutting tool holder of claim 10, further including a release latch disposed within said quick change head, wherein said release latch is adapted to release the spring loaded latch lock.

17. A cutting tool holder for quickly changing a cutter insert, said cutting tool holder comprising:
    a base member adapted for securement to a cutting machine carriage and including at least one locking bolt;
    a main body shaped to provide a multi-surface interface with said base member including a dovetail portion disposed at one end, said main body being adjustable relative to said base member in at least primary, secondary and tertiary orientations; and
    a quick change head comprising a first side having a channel adapted to mate with said dovetail portion and a second side including a means for securing a cutting tool cartridge, wherein said dovetail and said channel are each tapered such that a narrow portion of said dovetail slides into a wider portion of said channel.

18. The cutting tool holder of claim 17, wherein said quick change head further includes a port configured to provide access to said release latch.

19. A cutting tool cartridge comprising:
    a body including a plurality of passages and a recess adapted to partially engage a dowel;
    a plurality of t-nuts, wherein said passages accommodate screws that are capable of engaging said t-nuts and securing said t-nuts to said body;
    a cutting blade having a first edge including a slotted recess, a cutting edge opposite said first edge, and a top surface including a channel traversing the length of said surface, wherein said blade is positioned on said body such that the slotted recess partially engages said dowel; and
    a blade clamp positioned above said cutting blade adapted to secure said cutting blade to said body, said blade clamp having a front edge including a first radius, capable of engaging said channel, a rear edge opposite said front edge having a second radius, and a hole adapted to receive a screw.

20. The cutting tool cartridge of claim 19, wherein said body further includes a threaded bore adapted to receive said screw, and a surface angled such that tightening of said screw causes said blade to pull back into a secure position.

* * * * *